United States Patent
Deblonde

(10) Patent No.: US 12,479,735 B2
(45) Date of Patent: Nov. 25, 2025

(54) SEPARATION OF ELEMENTS USING POLYOXOMETALATES AND CATIONS

(71) Applicant: Lawrence Livermore National Security, LLC, Livermore, CA (US)

(72) Inventor: Gauthier Deblonde, San Ramon, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 753 days.

(21) Appl. No.: 17/722,248

(22) Filed: Apr. 15, 2022

(65) Prior Publication Data
US 2023/0331562 A1   Oct. 19, 2023

(51) Int. Cl.
*C01B 35/12* (2006.01)
*C22B 3/44* (2006.01)
*C22B 34/00* (2006.01)
*C22B 59/00* (2006.01)

(52) U.S. Cl.
CPC ............ *C01B 35/128* (2013.01); *C22B 3/44* (2013.01); *C22B 34/00* (2013.01); *C22B 59/00* (2013.01)

(58) Field of Classification Search
CPC ......... C01B 35/128; C22B 3/44; C22B 34/00; C22B 59/00
See application file for complete search history.

(56) References Cited

U.S. PATENT DOCUMENTS

| 6,043,184 A * | 3/2000 | Karmakar | C07C 51/215 502/313 |
| 2003/0157012 A1* | 8/2003 | Pope | C01G 35/00 423/2 |
| 2019/0184041 A1* | 6/2019 | Strong | A61P 35/00 |

(Continued)

FOREIGN PATENT DOCUMENTS

| CS | 215493 B1 * | 8/1982 |
| WO | 2017085404 A1 | 5/2017 |
| WO | 2018097871 A3 | 7/2018 |

OTHER PUBLICATIONS

Antonio et al. JournalofAlloysandCompounds 1998, 271-273, 846-849 (Year: 1998).*

(Continued)

*Primary Examiner* — Sally A Merkling
*Assistant Examiner* — Jordan W Taylor
(74) *Attorney, Agent, or Firm* — Zilka-Kotab, P.C.

(57) ABSTRACT

A method includes forming a solution comprising a solvent and at least two elements selected from: scandium (Sc), yttrium (Y), one or more lanthanides, and one or more actinides. The method includes adding an effective amount of at least one polyoxometalate for forming complexes with at least one of the elements and adding an effective amount of a cation for causing precipitation of at least some of the complexes of one of the elements. Substantially all of another of the elements remains in solution during the precipitation of the at least some of the complexes of the one of the elements. A kit includes a polyoxometalate, a cation, (Continued)

and instructions for adding effective amounts of the polyoxometalate and the cation for separating at least two elements selected from the group consisting of: scandium (Sc), yttrium (Y), one or more lanthanides, and one or more actinides via a precipitation reaction.

24 Claims, 2 Drawing Sheets

(56) References Cited

U.S. PATENT DOCUMENTS

2019/0287691 A1* 9/2019 Abergel ............... G21C 19/46
2021/0268132 A1* 9/2021 Deblonde ............. A61K 51/08

OTHER PUBLICATIONS

Colliard et al. LLNL Disclosure for Nature Chemistry, Dec. 2, 2021 (Year: 2021).*
Li et al. CrystEngComm, 2012, 14, 1397 (Year: 2012).*
Luo et al. Inorganic Chemistry, 2001, 40, 1894-1901 (Year: 2001).*
Marrot et al. J. Am. Chem.Soc. 2012, 134, 1724-173 (Year: 2012).*
Mialane et al. Inorganic Chemistry, vol. 42, No. 6, 2003 (Year: 2003).*
Rais et al. CS215493B1 English Machine Translation (Year: 1982).*
Deblonde et al., "Ultra-selective ligand-driven separation of strategic actinides," Nature Communications, 2019, pp. 1-9.
Deblonde et al., "Chelation and stabilization of berkelium in oxidation state +IV," Nature Chemistry, Apr. 10, 2017, pp. 843-849.
Deblonde et al., "The coordination properties and ionic radius of actinium: A 120-year-old enigma," Coordination Chemistry Reviews, vol. 446, 2021, pp. 1-21.
Deblonde et al., "Characterization of Americium and Curium Complexes with the Protein Lanmodulin: A Potential Macromolecular Mechanism for Actinide Mobility in the Environment," Journal of the American Chemical Society, vol. 143, 2021, pp. 15769-15783.
Colliard et al., "Polyoxometalates as ligands to synthesize, isolate and characterize compounds of rare isotopes on the microgram scale," Nature Chemisty, Sep. 1, 2022, 12 pages, retrieved from https://www.nature.com/articles/s41557-022-01018-8.
Zhang et al., "Ultrafiltration separation of nanoscale Am(VI)-polyoxometalate clusters from lanthanides," Research Square, Apr. 1, 2022, 17 pages.
Deblonde et al., "Capturing an elusive but critical element: Natural protein enables actinium chemistry," Science Advances, vol. 7, 2021, pp. 1-10.
Muller et al., "Probing electronic structure in berkelium and californium via an electron microscopy nanosampling approach," Nature Communications, 2021, pp. 1-6.
Deblonde et al., "Selective and Efficient Biomacromolecular Extraction of Rare-Earth Elements using Lanmodulin," Inorganic Chemistry, vol. 59, 2020, pp. 11855-11867.

* cited by examiner

SEPARATION OF ELEMENTS USING POLYOXOMETALATES AND CATIONS

This invention was made with Government support under Contract No. DE-AC52-07NA27344 awarded by the United States Department of Energy. The Government has certain rights in the invention.

FIELD OF THE INVENTION

The present invention relates to separation of elements, and more particularly, this invention relates to separation of f-block and/or rare earth elements using polyoxometalates and cations.

BACKGROUND

While radioisotopes such as actinides and lanthanides have unique physicochemical properties that make them useful for applications including energy, medicine, space exploration, defense, and research, only a modest number of their compounds have been characterized to date, impeding the development of efficient separation and purification methods. The synthesis and characterization of metal-ligand complexes provide invaluable information on the coordination chemistry and physicochemical properties of elements across the periodic table. Problematically, studying the chemical properties of radioelements and designing new separation methods is inherently challenging due to radiation-related constraints and limited access to compatible research facilities. Further compounding these challenges is the lesser-known aspect of radiochemistry: the high cost and low availability of the isotopes severely restrict the experimental space and chemical systems investigated. In fact, most synthetic approaches and spectroscopic tools available today are not compatible with highly radioactive and/or rare isotopes, in part, because these approaches and tools require large amounts of materials, a factor that correspondingly raises costs, increases consumption of precious isotope resources, and hinders discovery of new radiochemical purification methods.

Conventional methods for separating f-block elements include liquid-liquid extraction or chromatography techniques. These techniques require many steps and are not cost- or resource-efficient. Furthermore, these techniques mainly rely on small organic molecules (e.g., extractants, grafted-ligands, water-soluble ligands acting as hold-back reagents, etc.) that have been selected based on their affinity and selectivity for the target elements. However, for small molecules, the variations of the chelating moieties and the nature of the atoms interacting with the target metal are limited. The vast majority of actinide complexes reported in the literature concern organic ligands with oxygen- and/or nitrogen-containing groups, and, to a lesser extent, ligands with sulfur or phosphorous atoms.

Furthermore, separation processes have limited selectivity, particularly for actinide-actinide and actinide-lanthanide separations. The low selectivity observed in actinide separation processes is also present in other sectors, such as rare earth element production. Furthermore, small organic molecules are prone to degradation via radiolysis or oxidation and only provide access to a fraction of the possible oxidation states of the f-block elements. For instance, the americium/curium separation would be useful to further recycle nuclear waste and to close the nuclear fuel cycle, but such separation is reputedly one of the most challenging of the periodic table because $Am^{3+}$ and $Cm^{3+}$ are very similar.

It is difficult to assess and access the full potential of actinide chemistry and to address outstanding challenges e.g., isotope capture and separation, design of new extractants, ligands for emerging medical isotopes, recovery from irradiated targets, radioactive material aging, nature of actinide bonds, and lack of experimental data to test models. An ideal solution would enable harvesting chemical information on radioactive compounds while using very small quantities (micrograms or less), facilitate the screening of interactions between radioisotopes and various elements and molecules, and yield simple and efficient yet scalable chemical separation processes for radioisotopes such as actinide and/or lanthanide elements.

SUMMARY

A method, according to one embodiment, includes forming a solution comprising a solvent and at least two elements selected from the group consisting of: scandium (Sc), yttrium (Y), one or more lanthanides, and one or more actinides. The method also includes adding an effective amount of at least one polyoxometalate for forming complexes with at least one of the elements and adding an effective amount of a cation for causing precipitation of at least some of the complexes of one of the elements. Substantially all of another of the elements remains in solution during the precipitation of the at least some of the complexes of the one of the elements.

A kit, according to another embodiment, includes a polyoxometalate and a cation, and instructions for adding effective amounts of the polyoxometalate and the cation for separating at least two elements selected from the group consisting of: scandium (Sc), yttrium (Y), one or more lanthanides, and one or more actinides via a precipitation reaction.

Other aspects and advantages of the present invention will become apparent from the following detailed description, which, when taken in conjunction with the drawings, illustrate by way of example the principles of the invention.

DETAILED DESCRIPTION

Figure 1:
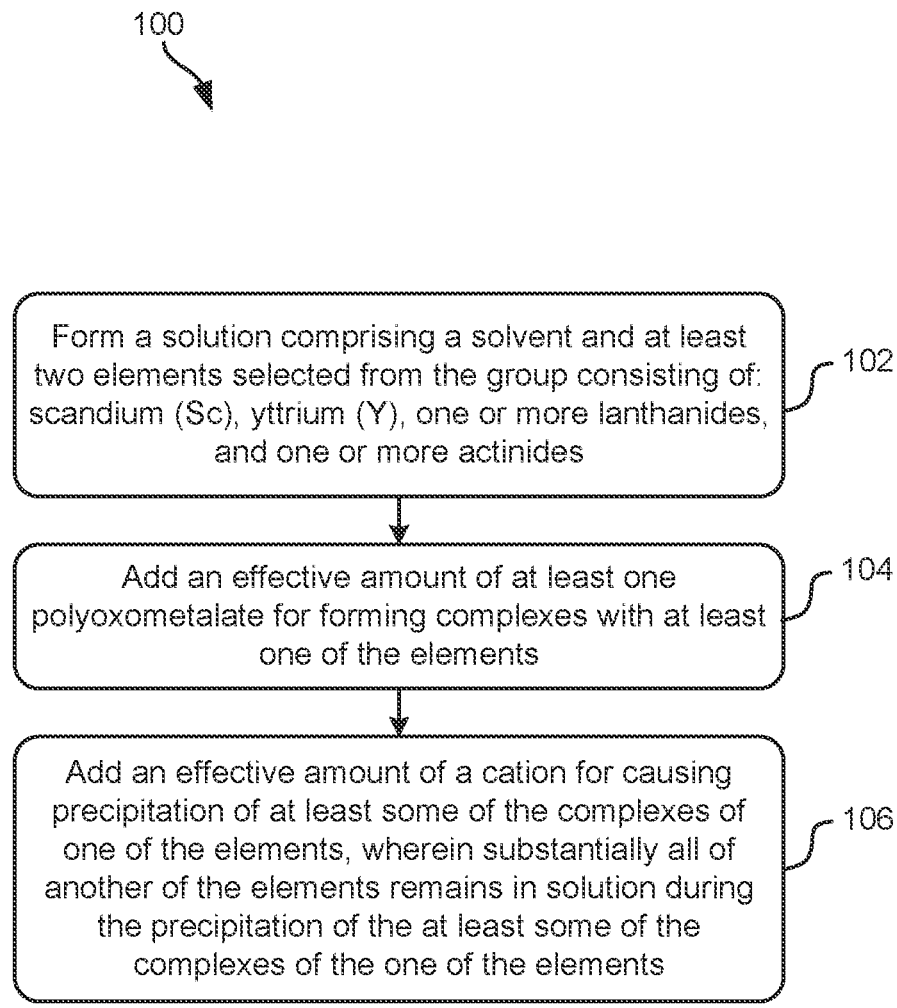
FIG. 1 is a flowchart of a method, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of separation of elements using polyoxometalates and cations and/or related systems and methods.

In one general embodiment, a method includes forming a solution comprising a solvent and at least two elements selected from the group consisting of: scandium (Sc), yttrium (Y), one or more lanthanides, and one or more actinides. The method also includes adding an effective amount of at least one polyoxometalate for forming complexes with at least one of the elements and adding an effective amount of a cation for causing precipitation of at least some of the complexes of one of the elements. Substantially all of another of the elements remains in solution during the precipitation of the at least some of the complexes of the one of the elements.

In another general embodiment, a kit includes a polyoxometalate and a cation; and instructions for adding effective amounts of the polyoxometalate and the cation for separating at least two elements selected from the group consisting of: scandium (Sc), yttrium (Y), one or more lanthanides, and one or more actinides via a precipitation reaction.

Actinides and lanthanides have unique properties which make them of interest for many applications including nuclear fuel applications, analytical chemistry, nuclear medicine, etc. Actinide research isotopes are only produced by a handful of institutions around the world and can only be synthesized and purified in minute quantities: milligram scale for americium, curium, berkelium, and californium; tens of micrograms for actinium; a few micrograms for einsteinium; and smaller amounts for heavier elements. Other f-block element isotopes are either in short supply, too radioactive, or too rare (e.g., limited historical stocks but not produced anymore) to study their compounds chemical properties in detail.

At least some aspects of the present disclosure provide a method for separating f-block elements, including separating lanthanide elements from actinide elements, and vice versa, as well as lanthanide-lanthanide separation and actinide-actinide separation. At least some further aspects of the present disclosure include a method for separating rare earth elements from rare earth elements, separating actinides from rare earth elements, and vice versa. Conventional methods for f-block element separation are based on liquid-liquid extraction or chromatographic separation. Macromolecular approaches described herein leverage a class of ligands called polyoxometalates (POMs) to overcome limitations of the foregoing conventional techniques. At least some aspects of the presently disclosed methods may be referred to as "POM-driven precipitation" which includes selective precipitation of target elements. While not wishing to be bound by any particular theory, it is presently believed that the POM-driven precipitation described herein is based on solubility differences induced by the formation of complexes between the target element (e.g., actinide ion, lanthanide ion, and/or rare earth ion), a polyoxometalate ion (e.g., $[BW_{11}O_{39}]^{9-}$, $[PW_{11}O_{39}]^{7-}$, $[W_5O_{18}]^{6-}$, etc.), and a positively charged counter ion (e.g., $Cs^+$, $Rb^+$, etc.). The inventor has discovered, quite by accident, that the interplay between the three types of components leads to significant solubility differences, and has developed the processes described herein utilizing that behavior to enable actinide-lanthanide separations, actinide-rare earth element separations, rare earth element separations, lanthanide-lanthanide separations, and actinide-actinide separations.

Conventional methods require another organic component, e.g., a "diluent." The extractant cannot be used as-is (it is usually too viscous), so the extractant is diluted into another organic component (the diluent). Essentially, the organic "extractant" is diluted into an organic "diluent" and both constitute the so-called "organic phase" or "organic solvent." For example, in a PUREX process, the extractant is TBP (tri-butyl phosphate) and TBP is diluted in the diluent "dodecane." The combination of TBP and dodecane represent the organic phase. In stark contrast, advantageously, the process described herein, in some approaches, can be "all-aqueous" and/or "all-inorganic" and does not require the presence of an organic extractant and/or an organic ligand. Furthermore, the hydrometallurgical separation techniques described herein are far more efficient and easier to implement than conventional methods.

The inventor was surprised to discover that by controlling the amount of cation added to a solution of POMs and f-block elements and/or rare earth elements, selective precipitation of the individual elements can be achieved. This result was unexpected. The inventor was surprised at the effectiveness of the separation, where it is usually very difficult to separate trivalent lanthanide ions from trivalent actinide ions (e.g., such as $Eu^{3+}$ and $Cm^{3+}$, respectively) using conventional processes. Furthermore, the ability to selectively separate the elements from one another was surprising given that, intuitively, one would expect two positively charged ions to precipitate together. Furthermore, one would not expect to use cations (e.g., $Cs^+$) to precipitate other cations (e.g., $Eu^{3+}$, $Cm^{3+}$, etc.).

FIG. 1 shows a method 100, in accordance with one embodiment. As an option, the present method 100 may be implemented to separate elements selected from the group consisting of: scandium (Sc), yttrium (Y), one or more lanthanides, and one or more actinides. Of course, however, this method 100 and others presented herein may be used in other aspects which may or may not be related to the illustrative embodiments listed herein. Further, the methods presented herein may be carried out in any suitable environment. Moreover, more or less operations than those shown in FIG. 1 may be included in method 100, according to various embodiments. It should also be noted that any of the aforementioned features may be used in any of the embodiments described in accordance with the various methods.

Method 100 includes operation 102. Operation 102 includes forming a solution comprising a solvent and at least two elements selected from the group consisting of: scandium (Sc), yttrium (Y), one or more lanthanides, and one or more actinides. For example, the at least two elements may include any combination of Sc, Y, one or more lanthanides, and one or more actinides, including, but not limited to: Sc and Y, Sc and at least one lanthanide, Y and at least one lanthanide, Sc and at least one actinide, Y and at least one actinide, at least two lanthanides, at least two actinides, etc.

In preferred aspects, the at least two elements are dissolved in the solvent. The solvent may include water, in at least one approach. In various approaches, the solvent has a pH between 1 and 7. In some aspects, a pH buffer (e.g., 0.1 M acetate, 0.1 M phosphate, etc.) may be used to adjust the pH, in a manner known in the art. In preferred aspects, the solvent is an aqueous solvent (e.g., not an organic solvent). In further preferred aspects, the solvent is completely aqueous.

In preferred aspects, at least one of the elements is an f-block element. As referred to throughout the present disclosure, f-block elements may include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), actinium (Ac), thorium (Th), protactinium (Pa), uranium (U), neptunium (Np), plutonium (Pu), americium (Am), curium (Cm), berkelium (Bk), californium (CO, einsteinium (Es), fermium (Fm), mendelevium (Md), nobelium (No), and lawrencium (Lr). The at least two elements may include any combination of the foregoing elements. In at least some approaches, the solution may comprise at least two f-block elements, at least three f-block elements, at least four f-block elements, at least five f-block elements, etc., wherein each of the f-block elements is unique (e.g., in a solution comprising at least three f-block elements, the solution comprises three different f-block elements).

In one exemplary aspect, one of the at least two elements is curium (Cm), and the other element is europium (Eu).

In further aspects, the at least two elements include an actinide (e.g., an actinide element) and a lanthanide (e.g., a lanthanide element). In other aspects, the at least two elements include two or more actinides. In other aspects, the at least two elements include two or more lanthanides. In yet other aspects, the at least two elements include two or more rare earth elements.

In general, f-block elements as referred to throughout the present disclosure include lanthanides and actinides, unless otherwise noted herein. Lanthanide elements include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Actinide elements include actinium (Ac), thorium (Th), protactinium (Pa), uranium (U), neptunium (Np), plutonium (Pu), americium (Am), curium (Cm), berkelium (Bk), californium (Cf), einsteinium (Es), fermium (Fm), mendelevium (Md), nobelium (No), and lawrencium (Lr).

In general, rare earth elements as referred to throughout the present disclosure include scandium (Sc), and yttrium (Y), and the lanthanides: lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu).

In at least some aspects, the at least two elements include two or more rare earth elements selected from the group consisting of: scandium (Sc), yttrium (Y), and one or more lanthanides. For example, the at least two elements may include a lanthanide and scandium. In another example, the at least two elements may include a lanthanide and yttrium.

In other aspects, the at least two elements include an actinide and an element selected from the group consisting of: scandium and yttrium. For example, the at least two elements may include an actinide and scandium. In another example, the at least two elements may include an actinide and yttrium.

Operation 104 includes adding an effective amount of at least one polyoxometalate for forming complexes with at least one of the elements. In various approaches, operation 104 includes adding an amount of polyoxometalate which is at least two times the concentration of one of the at least two elements in the solution. In preferred aspects, the method includes adding an effective amount of polyoxometalate to the solution such that all or nearly all (e.g., >90 at %, more preferably >95 at %) of the at least two elements are in complexes with the polyoxometalate. For example, more than a 2:1 stoichiometric ratio of polyoxometalate to atoms of the elements may be added to the solution resulting in excess polyoxometalate in the solution. Any of the foregoing amounts should be considered "effective amounts" to form the desired complexes, even the amount added in excess.

The polyoxometalate may include a polyoxotungstate, such as $[SiW_{11}O_{39}]^{8-}$, $[GeW_{11}O_{39}]^{8-}$, $[PW_{11}O_{39}]^{7-}$, $[AsW_{11}O_{39}]^{7-}$, $[SbW_{11}O_{39}]^{7-}$, $[TeW_{11}O_{39}]^{6-}$, $[W_5O_{18}]^{6-}$, $[P_2W_{17}O_{61}]^{10-}$, a polyoxomolybate, a polyoxovanadate, a polyoxoniobate, a polyoxotantalate, a polyoxopalladate, a Keggin ion, a Wells-Dawson ion, etc. Polyoxometalates may include d-block metals (e.g., tungsten (W), molybdenum (Mo), tantalum (Ta), niobium (Nb), palladium (Pd), vanadium (V), etc.). Polyoxometalates may include heteroatoms (e.g., phosphorous (P), boron (B), silicon (Si), germanium (Ge), sulfur (S), selenium (Se), arsenic (As), tellurium (Te), bismuth (Bi), etc.) In preferred aspects, the polyoxometalate has a charge of at least −5. The polyoxometalate preferably has a negative charge.

In at least some aspects, at least two polyoxometalates may be added to the solution. The combination of the polyoxometalates may be added in a combined concentration which is in an effective amount to form complexes with the elements, and preferably in at least two times the concentration of one of the at least two elements in the solution.

In preferred aspects, soluble lanthanide-POM and/or actinide-POM complexes may be formed in the solution following the addition of the polyoxometalate. For example, in a solution comprising dissolved curium ($Cm^{3+}$) and europium ($Eu^{3+}$), a POM, $[BW_{11}O_{39}]^{9-}$, may be added to the solution for forming a soluble actinide-POM complex ($[Cm(BW_{11}O_{39})_2]^{15-}$) and a soluble lanthanide-POM complex ($[Eu(BW_{11}O_{39})_2]^{15-}$).

In various aspects, the at least two elements have different charges. For example, the elements may be separated from each other in the following combinations: $Pu^{4+}$ and $Cm^{3+}$, $Am^{4+}$ and $Cm^{3+}$, $Ce^{4+}$ and $Eu^{3+}$, $Bk^{4+}$ and $Cf^{3+}$, $[NpO_2]^+$ and $Pu^{4+}$, $[UO_2]^{2+}$ and $Am^{3+}$, "$Pr^{4+}$ and $Nd^{3+}$, $Th^{4+}$ and $Sc^{3+}$, $Eu^{2+}$ and $Am^{3+}$, $AmO_2^{2+}$ and $Th^{4+}$, etc., or any combinations of element cations.

Operation 106 includes adding an effective amount of a cation for causing precipitation of at least some of the complexes of one of the elements. "At least some of the complexes" as used in operation 106 refers to the precipitation of individual complexes (comprising the first element), rather than at least some of the types of complexes (e.g., where each type of complex includes a different element).

In various approaches, operation 106 includes adding an amount of the cation which is at least 20 times the concentration of one of the at least two elements in the solution. In preferred aspects, the method includes adding an effective amount of cation to the solution for causing precipitation of at least some of the complexes of one of the elements. In preferred aspects, an effective amount of a cation is added to the solution to precipitate all or substantially all (>95 mol %) of the target complex while the other complex(es) remains in solution (e.g., dissolved in the solution). For example, an amount of cation is controllable to cause the precipitation of a first element complex while the other element(s) complex(es) remain in solution. The remaining element(s) complex(es) may be separated out individually, in sequence, as described in further detail below. In at least some approaches, a mixture of cations may be added in an effective amount for causing precipitation of at least some of the complexes of one of the elements.

The cation may include lithium ($Li^+$), sodium ($Na^+$), potassium ($K^+$), rubidium ($Rb^+$), cesium ($Cs^+$), francium ($Fr^+$), beryllium ($Be^{2+}$), magnesium ($Mg^{2+}$), calcium ($Ca^{2+}$), strontium ($Sr^{2+}$), barium ($Ba^{2+}$), radium ($Ra^{2+}$), ammonium ($NH_4^+$), a water-soluble ammonium-based cation (e.g., ethylammonium), etc. In preferred aspects, the cation is cesium ($Cs^+$). In various approaches, the cation is added in the form of a salt (e.g., cesium chloride, potassium nitrate, sodium sulfate, ammonium chloride, etc.). In at least some approaches, at least two cations (e.g., a mixture of different cations) may be added in an effective amount for causing precipitation of at least some of the complexes. For example, a mixture of $K^+$ and $Cs^+$ may be added, a mixture of $Na^+$ and $Rb^+$ may be added, etc.

In various approaches, method 100 includes removing the precipitate from the solution. The precipitate comprises at least one of the complexes (e.g., one type of the complexes, comprising one of the elements). The precipitate may be removed using suction, evaporation, centrifugation, flocculation, sedimentation, and/or filtration techniques known in the art, or in any manner that would become apparent to one having ordinary skill in the art upon reading the present disclosure. The complexes of the remaining elements do not precipitate and remain in solution (e.g., until additional cation is added to the solution, to be described in further detail below).

For example, assume a lanthanide complex and an actinide complex are formed in the solution following the addition of the polyoxometalate. The cation is added in an effective amount to cause precipitation of the actinide complex. The lanthanide complex remains in solution, thereby allowing separation of the actinide complex via known techniques such as suction, evaporation, centrifugation, flocculation, sedimentation, and/or filtration. In various approaches, the temperature of the environment (e.g., the temperature of the solution) of the POM-driven precipitation described herein may be tuned to increase or decrease the solubility of at least one of the elements (e.g., the complexes comprising the elements) in solution, where a higher temperature generally correlates to an increase in solubility. Accordingly, the temperature may be tuned within the limit tolerated by the solvent. For example, with water at ambient pressure, the temperature may be tuned within a range between 0 and 100 Celsius degrees.

In various approaches, method 100 includes processing the precipitated complex for removing the target element from the polyoxometalate. For example, the element may be liberated from the POM by submerging the precipitated complex in a solution having a pH greater than or equal to 7 or lower than 0. Since POMs are inorganic materials (e.g., formed of W, O, P atoms, Mo, O atoms, etc.), the POM may be recycled (e.g., used in another separation reaction comprising elements as described above) to reform the initial POM ion(s) for the separation process.

In various approaches, method 100 includes recovering at least some of the complexes of the another of the elements from the solution. "At least some of the complexes" as used herein refers to the precipitation of individual complexes, rather than at least some of the types of complexes (e.g., where each type of complex includes a different element). The recovery preferably includes adding additional cation for causing precipitation of the complexes of the another of the elements. For instance, continuing with the previous example, additional cesium cation ($Cs^+$) may be added to cause precipitation of the lanthanide-POM complex, $([Eu(BW_{11}O_{39})_2]^{15-})$, which remained dissolved in the solution after the precipitation of the less soluble actinide-POM complex, $[Cm(BW_{11}O_{39})_2]^{15-}$. In at least some approaches, the recovering may include evaporating the solvent from the solution, though any known technique may be used. This precipitated complex may then be processed via any of the techniques described above.

In at least some cases, a lanthanide-POM complex is less soluble than an actinide-POM complex and the lanthanide-POM complex precipitates before the actinide-POM complex.

In various aspects, the method 100 may include recovering at least some of the remaining complexes of another of the elements from the remaining solution. For example, additional cation may be added to the solution for causing precipitation of the complexes until at least some of the complexes are sequentially precipitated from the solution. An amount of cation for causing precipitation of the complex(es) is determinable by one having ordinary skill in the art using the techniques described herein without requiring undue experimentation. In at least some approaches, a different cation (or a mixture of different cations) may be added to cause precipitation of a different type of the complexes than the one previously precipitated out. In other approaches, the same cation may be added to cause precipitation of at least two different types of complexes.

In one specific example, in a solution comprising at least 3 different f-block elements dissolved in a solvent, a POM may be added to form complexes with each of the 3 f-block elements. A first amount of a cation may be added to cause precipitation of a first complex comprising a first of the 3 f-block elements. The precipitate comprising the first complex may be removed from the solution (e.g., comprising the remaining complexes) via techniques known in the art. A second amount of the cation may be added to cause precipitation of a second complex comprising a second of the 3 f-block elements. The precipitate comprising the second complex may be removed from the solution (e.g., comprising the remaining complex) via techniques known in the art. The third complex comprising the remaining f-block element may be recovered from the solution by adding additional cation (e.g., a third amount) to cause precipitation thereof, by evaporation of the solvent, by known filtration techniques, etc.

Figure 2:
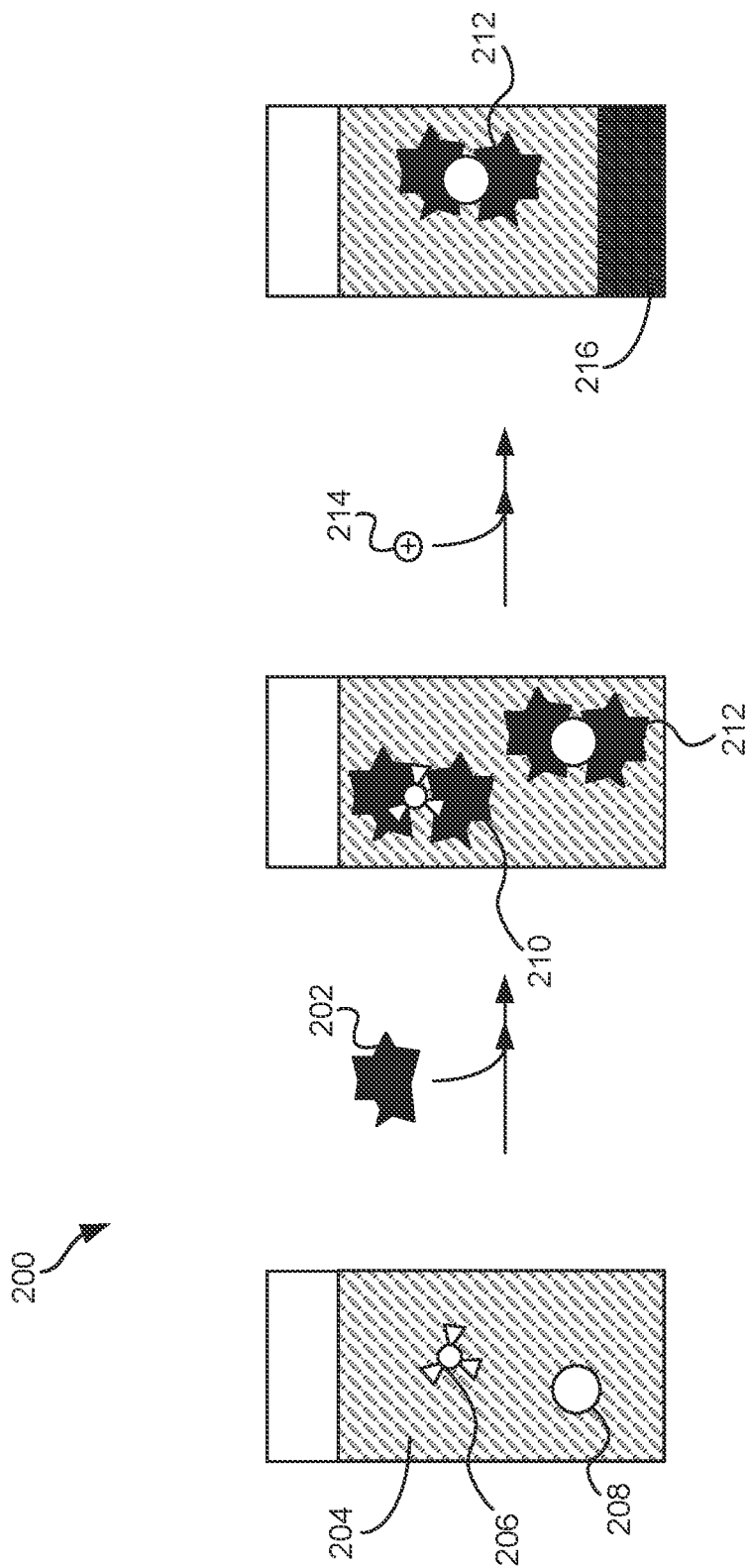
FIG. 2 is an exemplary implementation, in accordance with one aspect of the present invention.

FIG. 2 depicts an exemplary implementation 200, in accordance with one embodiment. As an option, the present exemplary implementation 200 may be implemented in conjunction with features from any other embodiment listed herein, such as those described with reference to the other FIGS. Of course, however, such exemplary implementation 200 and others presented herein may be used in various applications and/or in permutations which may or may not be specifically described in the illustrative embodiments listed herein. Further, the exemplary implementation 200 presented herein may be used in any suitable environment.

As shown, a POM 202, $[BW_{11}O_{39}]^{9-}$, is added to a solution comprising water 204, curium 206 ($Cm^{3+}$), and europium 208 ($Eu^{3+}$). A soluble actinide-POM complex 210 $([Cm(BW_{11}O_{39})_2]^{15-})$ is formed in the solution. Similarly, a soluble lanthanide-POM complex 212 $([Eu(BW_{11}O_{39})_2]^{15-})$ is formed in the solution. Prior to the addition of the cation 214, the complexes are entirely soluble in the solution and no precipitate is observed.

Cesium cation 214 ($Cs^+$) is added to the solution comprising the complexes for causing precipitation of the actinide-POM in the solid phase. Without wishing to be bound by any particular theory, it is presently believed that when the cesium cation 214 ($Cs^+$) is added to the system, it counter-balances the negative charges of the complexes, and a precipitate 216 is formed including the actinide-POM complex whereas the lanthanide-POM complex 212 does not precipitate. The lanthanide complex 212 ($[Eu(BW_{11}O_{39})_2]^{15-}$) surprisingly remains more soluble than the actinide complex 210 counterpart ($[Cm(BW_{11}O_{39})_2]^{15-}$).

The lanthanide complex 212 may be further separated from the solution (e.g., water 204) via known precipitation, suction, evaporation, centrifugation, flocculation, sedimentation, and/or filtration techniques, or by adding additional cesium cations 214, not shown, according to the novel techniques described herein.

In Use

At least some of the aspects of the present disclosure may be used in rare earth element separation, nuclear fuel recycling and/or nuclear fuel waste processing, research applications, medical isotopes production, etc. For example, POM-driven precipitation as described herein may be applied to separation of lanthanides ions from actinides ions, and vice versa, in the fields of nuclear fuel reprocessing and/or analytical chemistry protocols.

At least some aspects of the present disclosure provide techniques that enable an efficient and versatile strategy to synthesize and characterize coordination compounds of rare, costly, toxic, and/or highly radioactive isotopes. Such aspects may be used to generate a library of novel actinide-based materials available for a fundamental understanding of their separation-relevant coordination chemistry, isotopic effects, and selectivity trends.

In at least some approaches, a product includes a kit comprising a polyoxometalate, a cation, and instructions for adding effective amounts of the polyoxometalate and the cation, respectively, for separating at least two elements including scandium (Sc), yttrium (Y), one or more lanthanides, and/or one or more actinides from one another via the precipitation reaction described in detail above.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
forming a first solution comprising a solvent and at least two elements selected from the group consisting of: scandium (Sc), yttrium (Y), one or more lanthanides, and one or more actinides;
forming a second solution by adding an effective amount of at least one polyoxometalate to the first solution for forming complexes with at least one of the elements; and
adding an effective amount of a cation to the second solution for causing precipitation of at least some of the complexes of one of the elements,
wherein substantially all of another of the elements remains in the second solution during the precipitation of the at least some of the complexes of the one of the elements.

2. The method of claim 1, wherein at least one of the elements in the first solution is an f-block element selected from the group consisting of: lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), actinium (Ac), thorium (Th), protactinium (Pa), uranium (U), neptunium (Np), plutonium (Pu), americium (Am), curium (Cm), berkelium (Bk), californium (Cf), einsteinium(Es), fermium (Fm), mendelevium (Md), nobelium (No), and lawrencium (Lr).

3. The method of claim 1, wherein the at least two elements include an actinide and a lanthanide.

4. The method of claim 1, wherein the at least two elements include two or more actinides.

5. The method of claim 1, wherein the at least two elements include two or more rare earth elements selected from the group consisting of: scandium (Sc), yttrium (Y), and one or more lanthanides.

6. The method of claim 1, wherein the at least two elements include a lanthanide and an element selected from the group consisting of: scandium and yttrium.

7. The method of claim 1, wherein the at least two elements include an actinide and an element selected from the group consisting of: scandium and yttrium.

8. The method of claim 1, wherein the first solution is aqueous.

9. The method of claim 1, wherein the solvent is water.

10. The method of claim 1, wherein the first solution is essentially inorganic.

11. The method of claim 1, wherein the at least one polyoxometalate has a charge of at least $-5$.

12. The method of claim 1, wherein the at least one polyoxometalate is selected from the group consisting of: a polyoxotungstate, a polyoxomolybate, a polyoxovanadate, a polyoxoniobate, and a polyoxotantalate.

13. The method of claim 1, wherein the cation is selected from the group consisting of: lithium (Li), sodium (Na), potassium (K), rubidium (Rb), cesium (Cs), francium (Fr), beryllium (Be), magnesium (Mg), calcium (Ca), strontium (Sr), barium (Ba), radium (Ra), ammonium, and ethlyammonium.

14. The method of claim 1, wherein the cation is added in the form of a salt.

15. The method of claim 1, wherein the cation is cesium (Cs).

16. The method of claim 1, wherein at least two different cations are added to the second solution.

17. The method of claim 1, wherein the amount of the at least one polyoxometalate added to the first solution is at least two times the concentration of one of the at least two elements in the first solution.

18. The method of claim 1, wherein the amount of the cation added to the second solution is at least 20 times the concentration of one of the at least two elements in the second solution.

19. The method of claim 1, comprising removing the precipitated complex from the second solution.

20. The method of claim 1, comprising processing the precipitated complex for removing the element from the at least one polyoxometalate.

21. The method of claim 1, comprising recovering at least some of the complexes of the another of the elements from the second solution.

22. The method of claim 21, wherein the recovering includes adding additional cation for causing precipitation of the complexes of the another of the elements.

23. The method of claim 21, wherein the recovering includes evaporating the solvent from the second solution.

24. The method of claim 1, comprising performing a method using a kit, the kit comprising:
- the at least one polyoxometalate;
- the cation; and
- instructions for adding the effective amounts of the at least one polyoxometalate and the cation for causing the precipitation.

* * * * *